United States Patent
Rhoades

(10) Patent No.: US 7,680,841 B2
(45) Date of Patent: Mar. 16, 2010

(54) DETERMINING WHETHER DATA WRITTEN TO SOURCE STORAGE LOCATIONS ACCORDING TO A WRITE ORDER IS COPIED TO CORRESPONDING TARGET STORAGE LOCATIONS IN THE WRITE ORDER

(75) Inventor: Joshua Marshall Rhoades, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 11/460,230

(22) Filed: Jul. 26, 2006

(65) Prior Publication Data

US 2008/0040558 A1 Feb. 14, 2008

(51) Int. Cl.
*G06F 11/00* (2006.01)
(52) U.S. Cl. .......................................... 707/204; 714/54
(58) Field of Classification Search .................. 707/204, 707/200, 8, 201, 202, 205; 714/6, 15, 47, 714/48, 54; 711/118, 143, 162, 168
See application file for complete search history.

(56) References Cited

U.S. PATENT DOCUMENTS

| | | | |
|---|---|---|---|
| 5,748,829 A * | 5/1998 | Yamamoto et al. ............ 386/46 |
| 7,143,254 B2 * | 11/2006 | Suishu et al. ................ 711/162 |
| 2004/0098425 A1 * | 5/2004 | Wiss et al. ................... 707/204 |
| 2004/0215869 A1 * | 10/2004 | Mekkittikul et al. ......... 711/100 |
| 2005/0097388 A1 * | 5/2005 | Land .............................. 714/5 |
| 2005/0122790 A1 * | 6/2005 | Ueno et al. ............. 365/189.05 |
| 2005/0177603 A1 * | 8/2005 | Shavit ......................... 707/204 |
| 2005/0195653 A1 * | 9/2005 | Conley et al. .......... 365/185.11 |
| 2005/0289314 A1 * | 12/2005 | Adusumilli et al. ......... 711/168 |
| 2006/0095482 A1 * | 5/2006 | Suzuki et al. ............... 707/204 |
| 2007/0011180 A1 * | 1/2007 | Peretz et al. ................ 707/100 |

* cited by examiner

*Primary Examiner*—Tony Mahmoudi
*Assistant Examiner*—MD. I Uddin
(74) *Attorney, Agent, or Firm*—David W. Victor; Konrad Raynes & Victor LLP

(57) ABSTRACT

Provided are a method, system, and article of manufacture for determining whether data written to source storage locations according to a write order is copied to corresponding target storage locations in the write order. Values are written to indicated source storage locations in a write order. The values written to the source storage locations are copied to corresponding target storage locations. The values at the target storage locations are read and a determination is made from the read values whether the values were written to the target storage locations in the write order.

18 Claims, 6 Drawing Sheets

DETERMINING WHETHER DATA WRITTEN TO SOURCE STORAGE LOCATIONS ACCORDING TO A WRITE ORDER IS COPIED TO CORRESPONDING TARGET STORAGE LOCATIONS IN THE WRITE ORDER

BACKGROUND OF THE INVENTION

1. Field of the Invention

The present invention relates to a method, system, and article of manufacture for determining whether data written to source storage locations according to a write order is copied to corresponding target storage locations in the write order.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a source storage device.

In data mirroring systems, data is maintained in volume pairs. A volume pair is comprised of a volume in source primary storage device and a corresponding volume in a target storage device that includes an identical copy of the data maintained in the source volume. Source and target storage controllers may be used to control access to the primary and secondary storage devices. The integrity of data updates is related to insuring that updates are done at the target volumes in the volume pair in the same order as they were done on the source volume.

In many application programs, such as database systems, certain writes cannot occur unless a previous write occurred; otherwise the data integrity would be jeopardized. Such a data write whose integrity is dependent on the occurrence of previous data writes is known as a dependent write. Volumes in the source and target storages are consistent when all writes have been transferred in their logical order, i.e., all dependent writes transferred first before the writes dependent thereon. For such application programs, the data must be transferred in the order in which the data was written to ensure data integrity.

Data mirroring systems may write the data written to the primary or source storage synchronously or asynchronously. For synchronous mirroring, a complete is not returned to a host initiating the write request until the data is copied to both the source storage and the target mirror storage. For asynchronous mirroring, complete is returned to the host before the data is written to both the source and target storage locations.

There is a need in the art to be able to determine whether mirroring software is copying data to the target storage location in the order in which the data is written to the source storage locations so that data consistency is maintained.

SUMMARY

Provided are a method, system, and article of manufacture for determining whether data written to source storage locations according to a write order is copied to corresponding target storage locations in the write order. Values are written to indicated source storage locations in a write order. The values written to the source storage locations are copied to corresponding target storage locations. The values at the target storage locations are read and a determination is made from the read values whether the values were written to the target storage locations in the write order.

DETAILED DESCRIPTION

Figure 1:
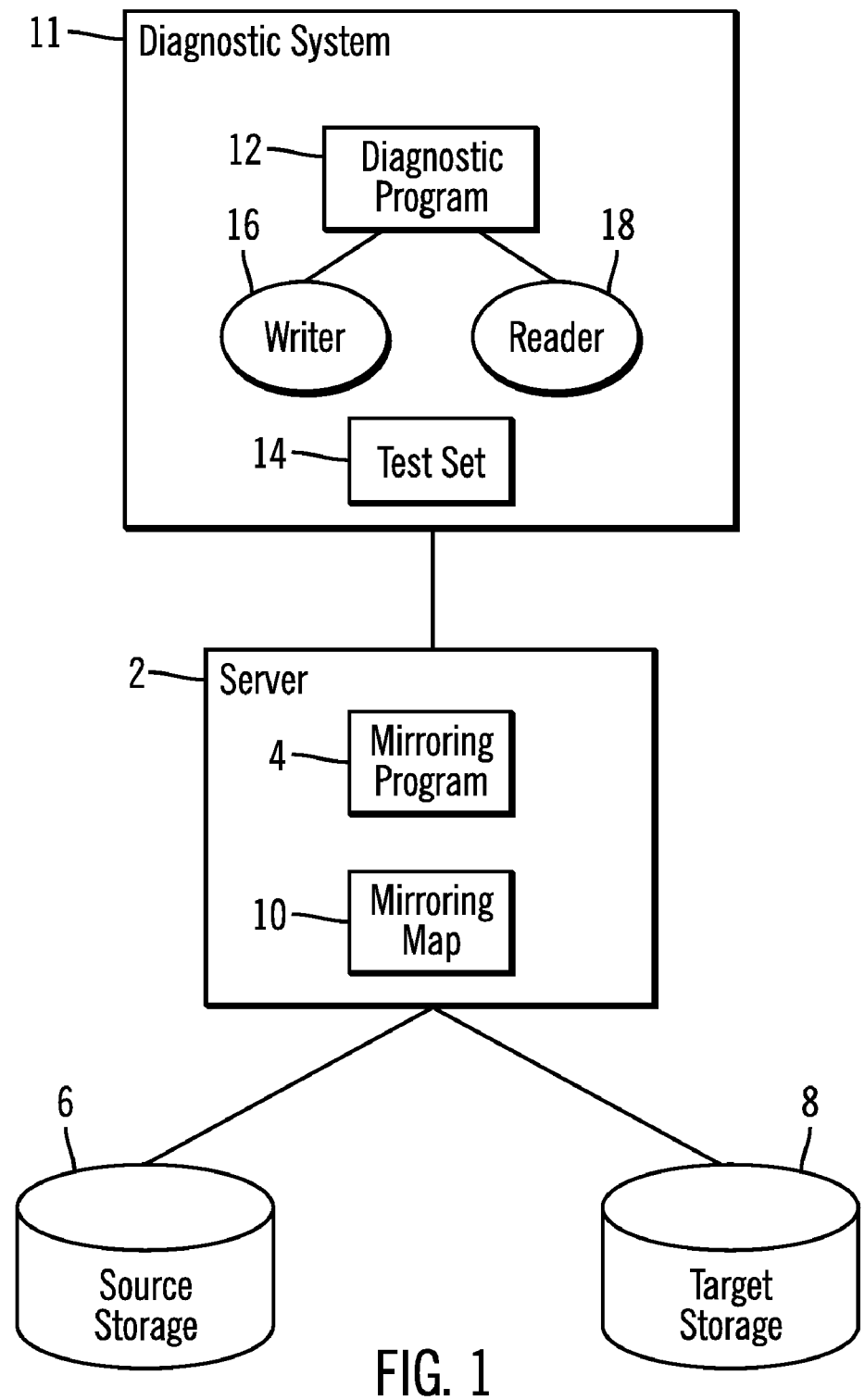
FIG. 1 illustrates an embodiment of a computing environment.

FIG. 1 illustrates an embodiment of a computing environment. A server 2 includes a mirroring program 4 used to replicate data in a source storage 6 to a target storage 8. A mirroring map 10 indicates source storage locations in the source storage 6, such as tracks, blocks, extents, to copy over to corresponding target storage locations in the target storage 8, where the mirroring map 10 indicates one target storage location for each corresponding source storage location. The mirroring program 4 may perform an initial replication of the source storage locations to the target storage locations. After this initial copy is made, the mirroring program 4 may then copy any writes to the source storage locations to the corresponding target storage locations. Upon detecting a write to an indicated source storage location, the mirroring program 4 uses the mirroring map 10 to determine the corresponding target storage location and then copies the write to the target storage location. The mirroring program 4 may copy writes to the target storage locations using synchronous or asynchronous copy technology.

A diagnostic system 11 includes a diagnostic program 12 that is used to test whether the mirroring program 4 is writing data in a consistent manner, such that data to the target storage locations are written in the same order with which data is written to the source storage locations. As discussed, for many operating environments, data consistency is very important. Thus, the diagnostic program 12 may be used by the developers of the mirroring program 4 to test whether the mirroring program 4 is replicating data in a consistent manner. Additionally, the diagnostic program 12 may be used by mirror program users who want to test a particular mirroring program they are currently using or considering whether to deploy for data inconsistencies.

The diagnostic system 11 and server 2 may communicate over a network, a direct connection, a wireless connection, etc.

The developer of the mirroring program 4 or other diagnostic program 12 users may create a test set 14 indicating source storage locations to which the diagnostic program 12 writes to test whether the mirroring program 4 is mirroring writes in a consistent manner. The test set 14 further indicates a write order in which data is written to the indicated source storage locations. The source storage locations indicated in the test set 14 may be contiguous and/or non-contiguous and the corresponding target storage locations indicated in the mirroring map 10 may be contiguous and/or non-contiguous. Further, the source storage locations indicated in the test set 14 may be included in one or more logical volumes configured in the source storage 6.

The server 2 may comprise any type of device, such as a server, storage controller, enterprise storage system, etc., for managing access to storage devices. In the embodiment of FIG. 1, one server 2 is shown as managing the writing of data to the source 6 and target 8 storages. In an additional embodiment, there may be separate source and target servers or storage controllers managing access to the source 6 and target 8 storages, respectively. Yet further, there may be multiple servers or controllers managing the source storage and multiple managing the target storage. The server 2 may comprise a stand-alone system or an expansion card, e.g., blade, in an expansion slot of a system. The server 2 may include an operating system (not shown) and other components, e.g., memory, processor, etc., to run the mirroring program 4 and diagnostic program 12. In certain embodiments, there may be multiple mirroring programs or independent mirroring processes operating independently of one another, such as if synchronous mirroring is used.

The source 6 and target 8 storages may comprise an array of storage devices, such as a Just a Bunch of Disks (JBOD), Direct Access Storage Device (DASD), Redundant Array of Independent Disks (RAID) array, virtualization device, tape storage, flash memory, etc. The developer or user creating the test set 14 may also specify the target storage locations in the mirroring map 10 corresponding to the source storage locations indicated in the test set 14. Alternatively, the diagnostic program 12 may automatically generate the test set 14 and indicate the source storage locations and corresponding target storage locations in the mirroring map 10. The server 2 may connect to the storages 6 and 8 via a direct cable connection or through one or more switches or a network.

The diagnostic program 12 initiates one or more writers 16 to write to the source storage locations according to the write order indicated in the test set 14 and initiates one or more readers 18 to read from the target storage locations corresponding to the source storage locations indicated in the test set 14. In one embodiment, the reader 18 reads from the target storage locations in a read order that is opposite of the write order for the corresponding source storage locations. Thus, if the writer 16 writes to source storage locations in order from 1 to n and the source storage locations 1 to n correspond to target storage locations 1 to n, then the reader 18 reads from target storage locations in the order from n to 1, i.e., the opposite order.

The writers 16 and readers 18 may each comprise applications executing on a separate thread or process and, thus, may execute separately and concurrently.

The diagnostic system 11 may comprise any system capable of running the writer 16 and reader 18 processes and communicating with the server 2 to send test writes and read the storages 6, 8. In FIG. 1, the writer 16 and reader 18 are shown as included in the same system. In an alternative embodiment, the diagnostic system 11 may comprise multiple computer systems, where the writer 16 and reader 18 may execute on separate computer systems.

Figure 2:
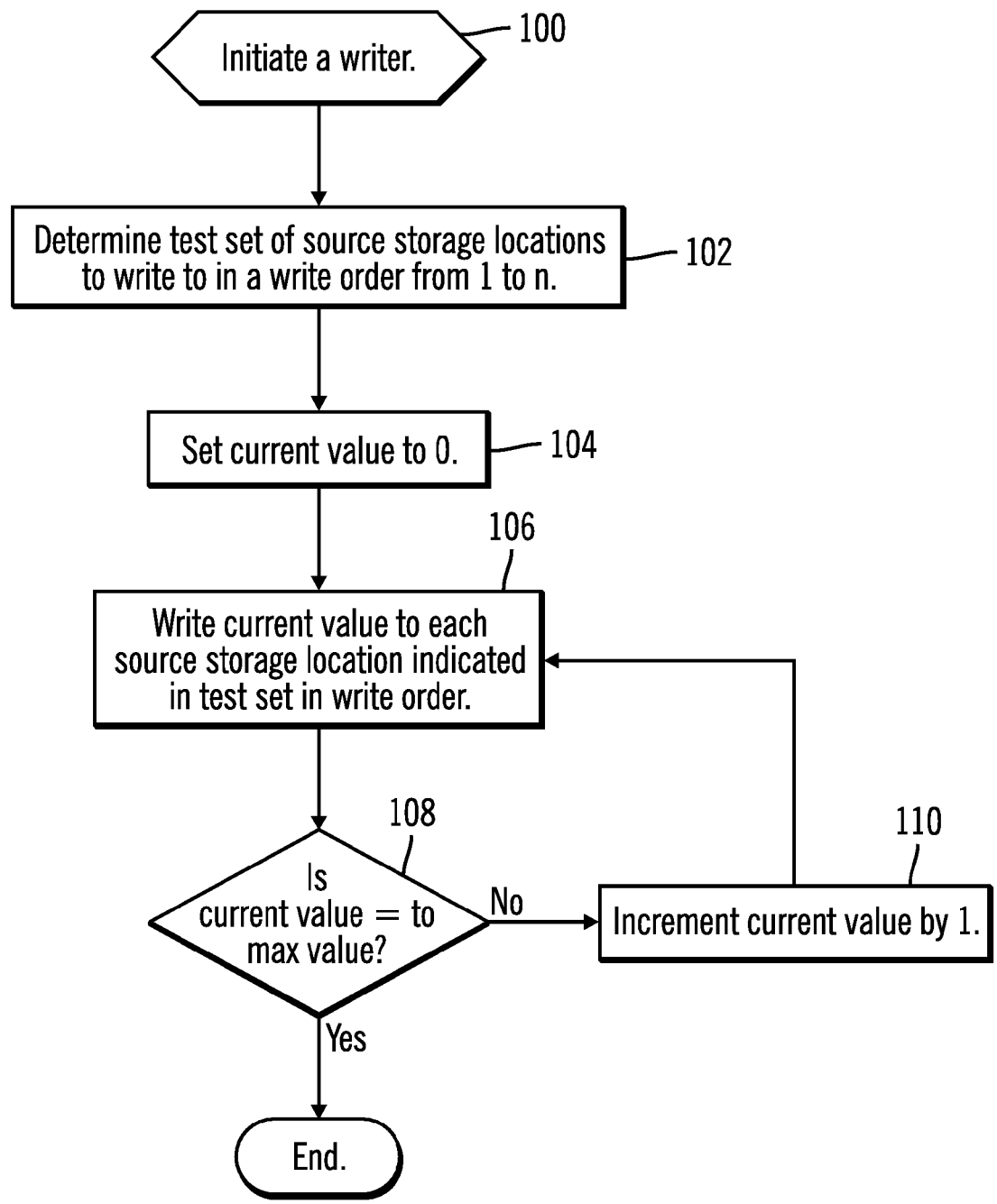
FIG. 2 illustrates an embodiment of operations to write indicated test values to source storage locations

FIG. 2 illustrates an embodiment of operations performed by a writer 16 with respect to a test set 14 provided to the writer 16 by the diagnostic program 12. The developer may start the mirroring program 4 before running the diagnostic program 12. Upon the diagnostic program 12 initiating (at block 100) a writer 16, the writer 16 determines (at block 102) the test set 14 of source storage locations to write to in the write order from 1 to n, where 1 to n comprise the source storage locations indicated in the test set 14, which may be contiguous and/or non-contiguous locations in one or more volumes configured in the source storage 6. The writer 16 sets (at block 104) a current value variable to zero and writes (at block 106) the current value to each source storage location indicated in the test set 14 in the write order, e.g., from 1 to n. If (at block 108) the current value is equal to a maximum value, which may be set by the user of the diagnostic program 12 or a default value, then control ends. Otherwise, if the current value is less than the maximum value, then the writer 16 increments (at block 110) the current value by one and proceeds back to block 106 to write the incremented current value to all the source storage locations in the write order.

Figure 3:
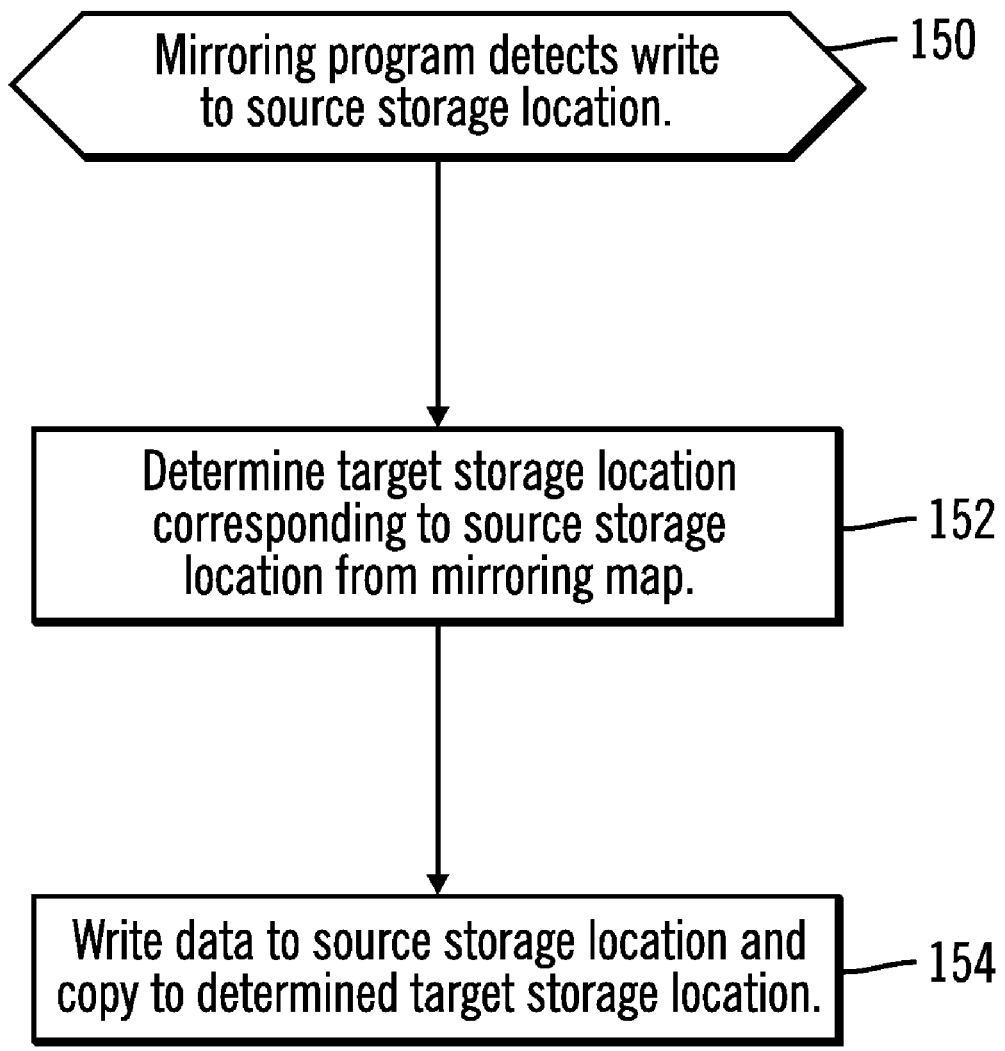
FIG. 3 illustrates an embodiment of operations to copy writes to the indicated source storage locations to corresponding target storage locations.

FIG. 3 illustrates an embodiment of operations performed by the mirroring program 4 to replicate writes to the source storage locations in the mirroring map 10 to the target storage 8. Upon detecting (at block 150) a write to a source storage location indicated in the mirroring map 10, the mirroring program 4 determines (at block 152) the target storage location corresponding to the updated source storage location from the mirroring map 10. The detected write may comprise a write performed by the writer 16 according to the operations of FIG. 2. The mirroring program 4 writes (at block 154) the write data to the source storage location and copies the write data to the determined target storage location in the target storage 8.

Figure 4:
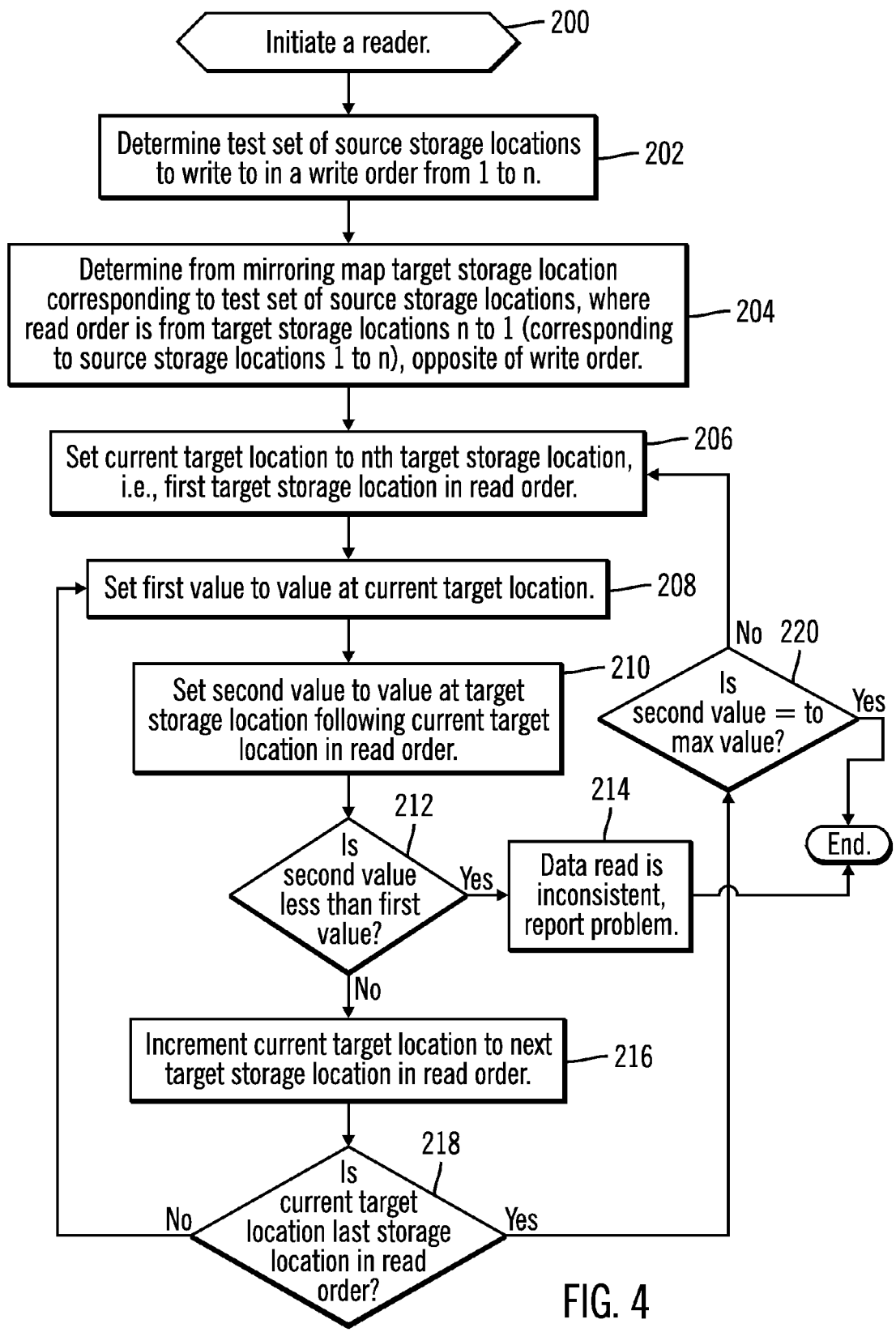
FIG. 4 illustrates an embodiment of operations to read test values written to the target storage locations to check for data inconsistencies.

FIG. 4 illustrates an embodiment of operations performed by the reader 18 to read the target storage locations corresponding, according to the mirroring map 10, to the source storage locations indicated in the test set 14. Control begins at block 200 with the diagnostic program 12 initiating a reader 18. The diagnostic program 12 may initiate the reader 18 after the writer 16 has started and has completed a first pass of writes to all locations 1 to n and the mirroring program 4 has copied all of this new data for locations 1 to n to the target storage 8.

The writer 16 may report completion of writing the first value, e.g., 0, to the storage locations 16 in the test set 14 to the diagnostic program 12 or reader 18. If the mirroring program 4 is writing the data synchronously, then the write to the source storage 6 does not complete until the write is confirmed to complete at the target storage 8. For asynchronous writes, completing the write to the source storage 6 does not ensure the copying of the write to the target storage 8 has completed. In such case, the writer 16 may independently confirm whether the data has been written to the target 8 before the reader proceeds 18. The reader 18 determines (at block 202) the test set 14 of source storage locations to which the writer 18 writes in a write order, e.g., from 1 to n. The reader 18 determines (at block 204) from the mirroring map 10 the target storage locations corresponding to the source storage locations indicated in the test set 14, where the read order is from target storage locations n to 1 (corresponding to source storage locations n to 1), which is opposite of the write order. In an alternative embodiment, the diagnostic program 12 may determine the target storage locations to read and the read order and pass this information to each reader 18.

To perform the reading, the reader 18 sets (at block 206) a current target location to the target storage location corresponding to the nth source storage location, i.e., first target storage location in read order. A first value is set (at block 208) to the value at the current target location. A second value is set (at block 210) to a value at the target storage location following the current target location in the read order, which is the target storage location corresponding to a source storage location preceding the source storage location corresponding to the current target location according to the write order. If (at block 212) the second value is less than the first value, then the data is inconsistent, and this inconsistency is reported (at block 214). The reason for the inconsistency is that a first target storage location corresponding to a first source storage location should have a value that is less than or equal to a second target storage location corresponding to a second source storage location when the value was written to the second source storage location before the first source storage location according to the write order. If the first target storage location has a value greater than the second target storage location, then the target storage was updated out of the write order, which indicates that the mirroring program 4 is not writing data in a consistent manner.

If (at block 212) the second value is greater than or equal to the first value, i.e., updates were copied to the target storage 8 in the correct order, then the reader 18 increments (at block 216) the current target location to a next target storage location according to the read order. In this way, the new current target location corresponds to a source storage location preceding the previous corresponding source storage location in the write order. In an alternative embodiment, the locations to which the test set 14 are written may be indexed in an index having entries 1 to n, where the writer 16 writes in sequential order to the locations corresponding to index entries 1 to n. In such case, the reader 18 starts reading from the nth entry in the index and proceeds backward through the index to the first entry. If (at block 218) the new current target location is not the last target storage location in read order, i.e., corresponding to the first source storage location 1 according to the write order (1 to n), then control proceeds back to block 208 to determine data consistency for the next target storage location in the read order. If (at block 218) the new current target location is the last target storage location in the read order, then the reader 18 determines (at block 220) whether the second value is the maximum value to which the writer 16 writes. If not, then there are further written values to consider and control proceeds back to block 206 to consider the next written values. Otherwise, if (at block 220) the second value is the maximum value, then the writer 16 will not write any further values and control for the reader 18 ends.

Figure 5:
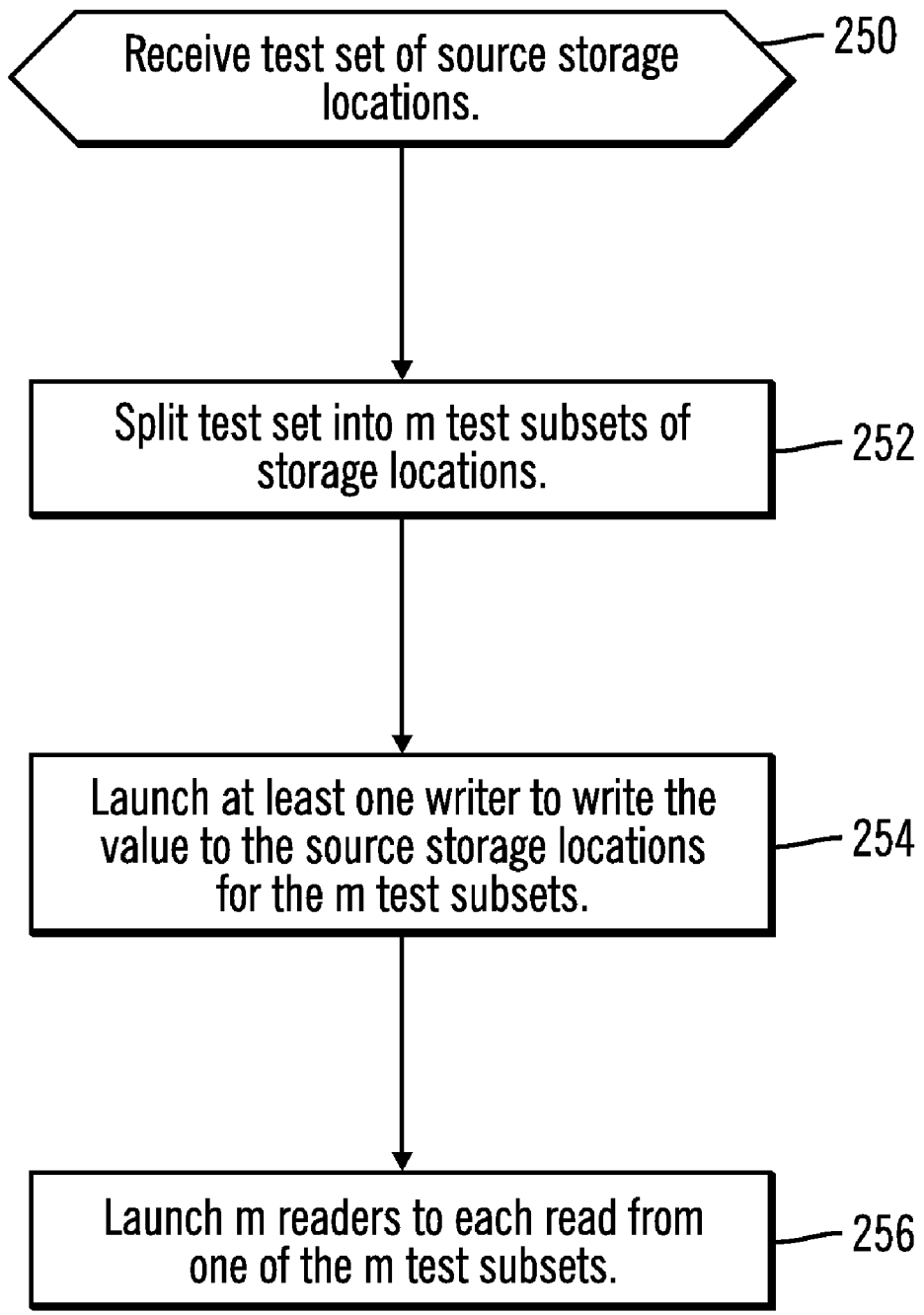
FIG. 5 illustrates an additional embodiment to use multiple writers and/or readers to write and read the test values.

FIG. 5 illustrates an embodiment of operations performed by the diagnostic program 12 to launch multiple writer 16 and/or reader 18 threads or processes to process a test set 14. The user of the diagnostic program 12 may specify to use multiple writer 16 and/or reader 18 threads for the diagnostic operations. Upon receiving (at block 250) the test set 14, the diagnostic program 12 divides (at block 252) the test set into m test subsets, where m is any integer greater than one, and wherein each of the m test subsets includes a subset of source storage locations ordered according to the write order. The subsets may not include any overlapping storage locations, i.e., the intersection of any two subsets is the empty set. The diagnostic program 12 launches (at block 254) at least one writer 16 to write the value to the source storage locations for the m test subsets according to the operations of FIG. 2. After writing a certain initial amount, e.g., all of the first written value, e.g., zero, to the source storage locations in one or more of the m test subsets, the diagnostic program 12 launches (at block 256) m readers to each read from one of the m test subsets. Yet further, the multiple readers may read from the same or different target storage locations to which the test set is written. The reader 18 may also read only a subset of the target storage locations n to 1 and/or randomly decide which subset of the test set written to the storage locations 1 to n to read.

As discussed, the reader 16 or writer 18 may confirm that the mirroring program 4 has in fact copied the data from the source storage locations to target locations for both synchronous and asynchronous writing before the reader 16 initiates reading operations.

With the described concurrent operations of the writer 16, mirroring program 4, and reader 18, data inconsistencies can be detected in the algorithm of the mirroring program 4 by detecting data inconsistencies in the writing of the test set 14 that is handled by the mirroring program 4. To increase the likelihood of detecting data inconsistencies in the writing of the test set, the user of the diagnostic program 12 can increase the diagnostic program 12 runtime and/or the number of writer 16 and reader 18 processes involved. Further, the time to perform the diagnostic operations is reduced by using multiple concurrently executing writers 16 and/or readers 18 to concurrently process test subsets. Developers may adjust the mirroring program 4 algorithm upon learning that the algorithm provides for data inconsistencies as determined by the diagnostic program 12.

In certain testing environments, the reason for detected out-of-order data may result from a source other than the mirroring program's algorithm. The reason for the detected data inconsistencies may result from the operating system of the diagnostic system, communication or other problems between multiple servers controlling mirroring among multiple volumes, etc. The user of the diagnostic program may deploy the diagnostic program on different hosts in communication with the server including the mirroring program to test the whole system.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the test data was copied from the source to target locations to test a mirroring program. In an alternative embodiment, the diagnostic program may be used to test whether test data written to a single location, i.e., where the source and target storage locations are the same, is consistent. This embodiment may be useful to test whether a host reading data reads the data in the same order it was written by a different host. Caching on the host and server may result in inconsistencies in the writing of data to a single storage location where there is no mirroring.

In the described embodiments, the diagnostic program 12 is used by developers to test a mirroring program 4 in product development. In alternative embodiments, the diagnostic program may be used in other contexts. For instance, network administrators or users may deploy the diagnostic program 12 to test the mirroring programs 4 offered by different vendors before purchasing a mirroring program 4 or after deploying the mirroring program 4 to monitor for data inconsistencies.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Figure 6:
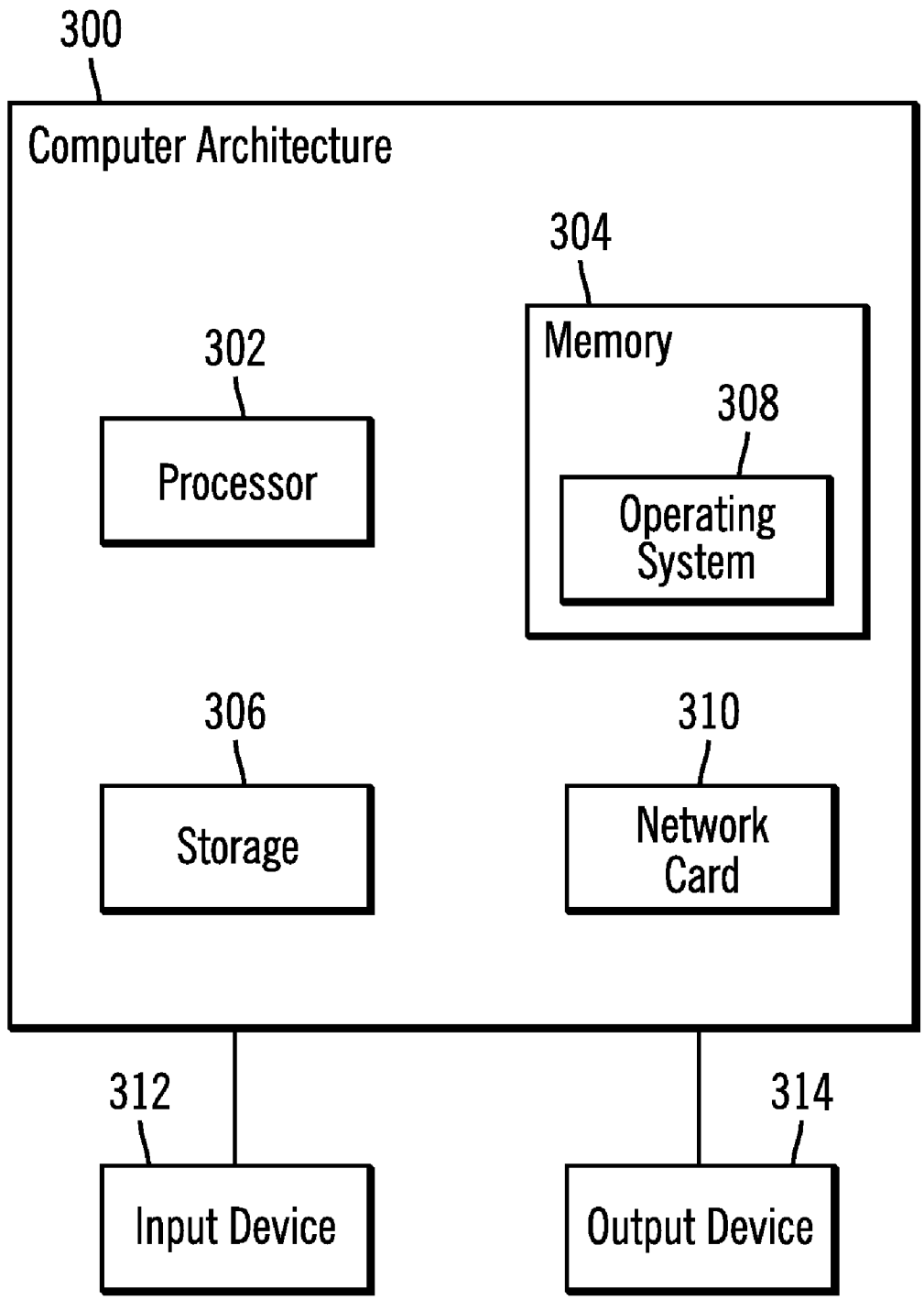
FIG. 6 illustrates an embodiment of a computing architecture.

FIG. 6 illustrates an embodiment of a computer architecture 300 that may be implemented at the server 2 and diagnostic system 11. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308 and application programs, in the storage 306 are loaded into the memory 304 and executed by the processor 302 in a manner known in the art. The architecture further includes a network card 310 to enable communication with a network. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

The illustrated operations of FIGS. 2, 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage media having code that when executed communicates with a mirroring program, a source storage, and a target storage, wherein the code is further executed to perform:

writing values to source storage locations in the source storage in a write order, wherein the mirroring program copies the values written to the source storage locations to corresponding target storage locations in a target storage, and wherein the written values indicate the write order in which they are written to the source storage locations;

reading the values at the target storage locations copied by the mirroring program; and comparing the read values, which comprise the copied written values indicating the write order in which the values were written to the source storage locations, to determine whether the read values were written to the target storage locations in the write order to determine whether the mirroring program is copying the values to the target storage locations in the write order in which the values are written to the source storage locations to maintain data consistency, wherein the operations of writing the values in the write order to the source storage locations, reading the values from the target storage locations, and determining from the read values whether the data was written to the target storage locations in the write order are performed repeatedly and concurrently.

2. The article of manufacture of claim 1, wherein the values are read from the target storage locations in a read order that is different from the write order.

3. The article of manufacture of claim 2, wherein the write order is in an opposite direction of the read order.

4. The article of manufacture of claim 1, wherein comparing the read values comprises:
   reading a first target storage location value corresponding to a first source target storage location value;
   reading a second target storage location value corresponding to a second source storage location; and
   comparing the values written to the first and second target storage locations to determine whether the values were written to the target storage locations in the write order.

5. The article of manufacture of claim 4, wherein writing the values to the source storage locations comprises:
   writing one value to each of the source storage locations in the write order;
   incrementing the value in response to writing the value to each of the source storage locations; and
   writing the incremented value to each of the source storage locations.

6. The article of manufacture of claim 5, wherein the second source storage location precedes the first source storage location in the write order, wherein comparing the values written to the first and second target storage locations comprises determining whether the value written to the second storage location is less than the value written to the first storage location, and wherein the values are determined to not be written to the target storage locations in the write order if the value at the second storage location is less than the value at the first storage location.

7. The article of manufacture of claim 1, wherein there are multiple concurrent read operations reading values from the target storage locations corresponding to the source storage locations and determining from the read values whether the data was written to the target storage locations in the write order for one write operation writing values to the source storage locations.

8. The article of manufacture of claim 1, wherein the source and target storage locations may comprise same storage locations or different storage locations.

9. A system in communication with a mirroring program, a source storage and a target storage, comprising:
   a processor;
   a computer readable storage medium including code executed by the processor, the code including:
   a writer for writing values to source storage locations in the source storage in a write order, wherein the mirroring program copies the values written to the source storage locations to corresponding target storage locations in the target storage, and wherein the written values indicate the write order in which they are written to the source storage locations; and
   concurrently executing readers for reading the values at the target storage locations copied by the mirroring program and comparing the read values, which comprise the copied written values indicating the write order in which the values were written to the source storage locations, to determine whether the values were written to the target storage locations in the write order to determine whether the mirroring program is copying the values to the target storage locations in the write order in which the values are written to the source storage locations to maintain data consistency.

10. The system of claim 9, wherein the reader reads the values from the target storage locations in a read order that is different from the write order.

11. The system of claim 10, wherein the write order is in an opposite direction of the read order.

12. The system of claim 9, wherein the reader compares the read values by:
   reading a first target storage location value corresponding to a first source target storage location value;
   reading a second target storage location value corresponding to a second source storage location; and
   comparing the values written to the first and second target storage locations to determine whether the values were written to the target storage locations in the write order.

13. The system of claim 12, wherein the writer writes the values to the source storage locations by:
   writing one value to each of the source storage locations in the write order;
   incrementing the value in response to writing the value to each of the source storage locations; and
   writing the incremented value to each of the source storage locations.

14. A method, comprising:
   writing values to source storage locations in a write order, wherein the written values indicate the write order in which they are written to the source storage locations;
   copying the values written to the source storage locations to corresponding target storage locations;
   reading the values at the target storage locations copied by the mirroring program; and
   comparing the read values, which comprise the copied written values indicating the write order in which the values were written to the source storage locations, to determine whether the values were written to the target storage locations in the write order to determine whether the values are copied to the target storage locations in the write order in which they are written to the source storage locations to maintain data consistency, wherein there are multiple concurrent read operations reading values from the target storage locations corresponding to the source storage locations and determining from the read values whether the data was written to the target storage locations in the write order for one write operation writing values to the source storage locations.

15. The method of claim 14, wherein the values are read from the target storage locations in a read order that is different from the write order.

16. The method of claim 15, wherein the write order is in an opposite direction of the read order.

17. The method of claim 14, wherein comparing the read values comprises:
   reading a first target storage location value corresponding to a first source target storage location value;
   reading a second target storage location value corresponding to a second source storage location; and
   comparing the values written to the first and second target storage locations to determine whether the values were written to the target storage locations in the write order.

18. The method of claim 17, wherein writing the values to the source storage locations comprises:

writing one value to each of the source storage locations in the write order;

incrementing the value in response to writing the value to each of the source storage locations; and writing the incremented value to each of the source storage locations.

* * * * *